US010020750B2

(12) United States Patent
Chen

(10) Patent No.: US 10,020,750 B2
(45) Date of Patent: Jul. 10, 2018

(54) CURRENT-RESONANT TYPE SWITCHING POWER SUPPLY APPARATUS WITH BURST CONTROL

(71) Applicant: FUJI ELECTRIC CO., LTD., Kawasaki-shi, Kanagawa (JP)

(72) Inventor: Jian Chen, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/397,769

(22) Filed: Jan. 4, 2017

(65) Prior Publication Data

US 2017/0237356 A1 Aug. 17, 2017

(30) Foreign Application Priority Data

Feb. 17, 2016 (JP) .................................. 2016-028016

(51) Int. Cl.
*H02M 3/335* (2006.01)
*H02M 3/337* (2006.01)
*H02M 1/00* (2006.01)

(52) U.S. Cl.
CPC ....... *H02M 3/33553* (2013.01); *H02M 3/337* (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC .......................... H02M 2001/0048; H02M 1/08
See application file for complete search history.

(56) References Cited

U.S. PATENT DOCUMENTS

| | | | |
|---|---|---|---|
| 2009/0179488 A1* | 7/2009 | Huang | H02M 3/33561 307/31 |
| 2010/0020578 A1* | 1/2010 | Ryu | H02M 1/4225 363/68 |
| 2011/0205761 A1* | 8/2011 | Tschirhart | H02M 3/3376 363/21.02 |
| 2014/0070781 A1* | 3/2014 | Yanagida | G05F 1/10 323/271 |
| 2014/0098574 A1* | 4/2014 | Hara | H02M 3/33592 363/21.02 |

(Continued)

FOREIGN PATENT DOCUMENTS

JP 2015-104246 A 6/2015

*Primary Examiner* — Jeffrey Gblende
*Assistant Examiner* — David A. Singh
(74) *Attorney, Agent, or Firm* — Rabin & Berdo, P.C.

(57) ABSTRACT

A switching power supply apparatus, including serially-connected first and second switching elements, a series circuit of a resonant inductance and a resonant capacitor connected in parallel to the first or second switching element, first and second capacitors respectively connected in parallel to the first and second switching elements, and a switching control circuit that alternately turns on the first and second switching elements. The switching control circuit includes a load detection circuit detecting a load state, a burst control circuit that switches to a burst control mode when the load detection circuit detects a light load, and a detection circuit that detects a timing at which a high-side reference voltage at a connection point between the first and second switching elements has a lowest value. The burst control circuit switches from switching stop to switching operation of the first and second switching elements at the detected timing.

7 Claims, 13 Drawing Sheets

(56) References Cited

U.S. PATENT DOCUMENTS

| | | | |
|---|---|---|---|
| 2014/0307484 A1* | 10/2014 | Yang | H02M 3/33569 363/21.12 |
| 2016/0020702 A1* | 1/2016 | Trescases | H02M 3/33592 363/17 |
| 2016/0065075 A1* | 3/2016 | Sugahara | H02M 1/4225 363/21.02 |
| 2016/0248332 A1* | 8/2016 | Ohtake | H02M 3/33546 |
| 2016/0294273 A1 | 10/2016 | Kawamura et al. | |
| 2016/0336865 A1* | 11/2016 | Imai | H02M 3/33546 |
| 2017/0237332 A1* | 8/2017 | Takahashi | H02M 1/083 323/235 |

* cited by examiner

US 10,020,750 B2

CURRENT-RESONANT TYPE SWITCHING POWER SUPPLY APPARATUS WITH BURST CONTROL

CROSS-REFERENCE TO RELATED APPLICATION

This application is based upon and claims the benefit of priority of the prior Japanese Patent Application No. 2016-028016, filed on Feb. 17, 2016, the entire contents of which are incorporated herein by reference.

BACKGROUND OF THE INVENTION

1. Field of the Invention

The embodiments discussed herein relate to a switching power supply apparatus, particularly, a switching power supply apparatus including a current-resonant type DC-DC switching converter and having reduced loss and noise when switching is returned in burst control at the time of light load.

2. Background of the Related Art

A current-resonant type DC-DC switching converter is suitable for improvement in efficiency and a reduction in thickness, and therefore, is widely employed in a switching power supply apparatus of, for example, a television. In such a switching power supply apparatus, in addition to control to keep an output voltage constant, automatic burst control is performed in order to improve efficiency at the time of light load.

The automatic burst control is a control method in which a load state indicating whether the load is heavy or light is detected and when the load becomes light, normal control is switched to burst control in which switching is suspended temporarily and when the load becomes heavy, the control returns from the burst control to the normal control.

In the burst control, while switching is stopped, the output voltage lowers, and therefore, when the output voltage becomes a predetermined voltage or less, switching is returned to prevent the output voltage from becoming the predetermined voltage or less (e.g., see Japanese Laid-open Patent Publication No. 2015-104246).

FIG. 9 is a circuit diagram illustrating a configuration example of a conventional switching power supply apparatus, FIG. 10 illustrates a configuration example of a conventional control IC, FIG. 11 is a circuit diagram illustrating a configuration example of a conventional load detection circuit, FIG. 12 is voltage generation timing chart at a point A of a conventional load detection circuit, and FIG. 13 is a timing chart of conventional burst control. Note that, in the following explanation, the terminal name and the voltage, the signal, etc., at its terminal, may be explained by using the same symbol.

As illustrated in FIG. 9, a conventional switching power supply apparatus has an input capacitor C1 connected to input terminals 10p and 10n and receives a DC input voltage Vi. This input voltage Vi is a DC voltage obtained by rectifying and smoothing a voltage of an AC power source, or a high-voltage, constant DC voltage generated by a power factor correction circuit.

To the input terminals 10p and 10n, a series circuit of a high-side switching element Qa and a low-side switching element Qb is connected, thereby forming a half bridge circuit. As the switching elements Qa and Qb, an N-channel MOSFET (Metal-Oxide-Semiconductor Field-Effect Transistor) is used in the example illustrated in FIG. 9.

A common connection point between the switching elements Qa and Qb is connected to one end of a primary winding P1 of a transformer T1 and the other end of the primary winding P1 is connected to the ground via a resonant capacitor C5. Here, a resonant inductance including an excitation inductance of the primary winding P1 of the transformer T1 and a leakage inductance between the primary winding P1 and secondary windings S1 and S2, and the resonant capacitor C5 form a resonant circuit. Note that, to the drain terminals and the source terminals of the switching elements Qa and Qb, capacitors Ca and Cb are connected, respectively. These capacitors Ca and Cb have equivalent capacitances including an external capacitance, an output capacitance of MOSFET, parasitic capacitances on the plus side and the minus side of the transformer T1, etc.

One end of the secondary winding S1 of the transformer T1 is connected to the anode terminal of a diode D3 and one end of the secondary winding S2 is connected to the anode terminal of a diode D4. The cathode terminals of the diodes D3 and D4 are connected to the positive terminal of an output capacitor C6 and an output terminal 11p. The negative terminal of the output capacitor C6 is connected to a common connection point between the secondary windings S1 and S2 and an output terminal 11n. The secondary windings S1 and S2, the diodes D3 and D4, and the output capacitor C6 form a circuit that rectifies and smooths an AC voltage generated by the secondary windings S1 and S2 and converts the AC voltage into a DC voltage, and form an output circuit of the switching power supply apparatus. The output terminals 11p and 11n are connected to a load, not illustrated.

The output terminal 11p is connected to the anode terminal of a light-emitting diode of a photo coupler PC1 via a resistor R8 and the cathode terminal of the light-emitting diode is connected to the cathode terminal of a shunt regulator SR1. To the anode terminal and the cathode terminal on both ends of the light-emitting diode, a resistor R6 is connected in parallel. The anode terminal of the shunt regulator SR1 is connected to the output terminal 11n. The shunt regulator SR1 has a reference terminal and the reference terminal is connected to a connection point between resistors R9 and R10 connected in series between the positive terminal and the negative terminal of the output capacitor C6. Between the reference terminal and the cathode terminal of the shunt regulator SR1, a series circuit of a resistor R7 and a capacitor C7 is connected. The shunt regulator SR1 causes a current in accordance with a difference between a built-in reference voltage and a divided potential of an output voltage Vo (voltage across both ends of the output capacitance C6) to flow through the light-emitting diode. The collector terminal of the photo transistor of the photo coupler PC1 is connected to an FB terminal of a control IC (Integrated Circuit) (switching control circuit) 12, the emitter terminal is connected to the ground, and between the collector terminal and the emitter terminal, a capacitor C2 is connected in parallel. The photo coupler PC1 and the shunt regulator SR1 form a feedback circuit that feeds back an error between the output voltage Vo and the reference voltage to the control IC 12.

The control IC 12 has a VH terminal connected to the positive terminal of the input capacitor C1 and a GND terminal connected to the ground. The control IC 12 also has an HO terminal connected to the gate terminal of the high-side switching element Qa via a resistor R1, and an LO terminal connected to the gate terminal of the low-side switching element Qb via a resistor R2. The control IC 12 further has a VB terminal, a VS terminal, a CA terminal, an IS terminal, and a VCC terminal. Between the VB terminal and the VS terminal, a capacitor C4 is connected and the VS terminal is connected to the common connection point between the switching elements Qa and Qb. To the CA terminal, one end of a capacitor Cca is connected and the other end of the capacitor Cca is connected to the ground. The IS terminal is connected to a common connection point between the series circuit of a capacitor Cs and a resistor Rs connected in parallel to the resonant capacitor C5. The series circuit of the capacitor Cs and the resistor Rs is a shunt circuit that shunts a resonant current and the current shunted by the shunt circuit is converted into a voltage signal by the resistor Rs for current detection and input to the IS terminal of the control IC 12 as a signal indicating a resonant current. The VCC terminal is connected to the positive terminal of a capacitor C3 and the negative terminal of the capacitor C3 is connected to the ground. The VCC terminal is further connected to the anode terminal of a diode D2 and the cathode terminal of the diode D2 is connected to the VB terminal. Here, although not illustrated in order to simplify FIG. 9, the VCC terminal is connected to an auxiliary winding of the transformer T1 via a diode. After the switching power supply apparatus starts up, the capacitor C3 is charged by the voltage generated by the auxiliary winding and the capacitor C3 is used as the power source of the control IC 12.

As illustrated in FIG. 10, the control IC 12 has a start-up circuit 21 whose input terminal is connected to the VH terminal and the output terminal of the start-up circuit 21 is connected to the VCC terminal and a low-side drive circuit 25. To the FB terminal, the input terminal of an oscillation circuit 22 is connected and the output terminal of the oscillation circuit 22, which outputs an on-trigger signal on_trg and an off-trigger signal off_trg, is connected to a control circuit 23. The output terminal of the control circuit 23, which outputs a high-side drive signal hi_pre, is connected to the input terminal of a high-side drive circuit 24 and the output terminal of the control circuit 23, which outputs a low-side drive signal lo_pre, is connected to the input terminal of the low-side drive circuit 25. The output terminal of the high-side drive circuit 24 is connected to the HO terminal and the output terminal of the low-side drive circuit 25 is connected to the LO terminal. The high-side drive circuit 24 is also connected to the VB terminal for the high-side power source and the VS terminal serving as a high-side reference voltage. The high-side drive circuit 24 also supplies a high-side reference voltage detection signal vs_det having detected the voltage at the VS terminal to the control circuit 23. The CA terminal and the IS terminal are connected to a load detection circuit 26. The load detection circuit 26 receives a signal sw_ctrl corresponding to the voltage at the VS terminal from the control circuit 23 and supplies a burst enable signal bur_en to a burst control circuit 27. The burst control circuit 27 receives the on-trigger signal on_trg from the oscillation circuit 22, receives the burst enable signal bur_en from the load detection circuit 26, and supplies a switching control signal sw_stop to the control circuit 23.

The start-up circuit 21 secures the power source voltage VCC of the control IC 12 by supplying a start-up current to the VCC terminal before starting a switching operation. The oscillation circuit 22 generates the on-trigger signal on_trg and the off-trigger signal off_trg whose switching frequency is controlled by the voltage at the FB terminal. The control circuit 23 supplies the high-side drive signal hi_pre and the low-side drive signal lo_pre to the high-side drive circuit 24 and the low-side drive circuit 25 based on the switching frequency and causes the high side and the low side to operate alternately. The load detection circuit 26 detects the load state on the secondary side on the primary side.

As illustrated in FIG. 11, the load detection circuit 26 has switches sw1 and sw2 connected in series and one terminal of the switch sw1 is connected to the IS terminal of the control circuit 23 and one terminal of the switch sw2 is connected to the GND terminal of the control circuit 23. The IS terminal is connected to a shunt circuit 30 including the capacitor Cs and the resistor Rs and inputs the signal IS obtained by converting a resonant current into a voltage signal. A point A that is a common connection point between the switches sw1 and sw2 is connected to the CA terminal of the control circuit 23 via a resistor Rf. To the CA terminal, the capacitor Cca is connected and an averaging circuit 31 including the resistor Rf and the capacitor Cca averages the voltage signal A at the point A. Further, the control terminal of the switch sw1 is connected to the sw_ctrl terminal to receive the signal sw_ctrl from the control circuit 23 and the control terminal of the switch sw2 is connected to the sw_ctrl terminal via an inverter circuit 32. Here, the switches sw1 and sw2 and the inverter circuit 32 form a switch circuit 33 and generate the voltage signal A proportional to an input current at the point A by making use of the signal SI or the like.

The load detection circuit 26 has an automatic burst control signal generation circuit 34. The automatic burst control signal generation circuit 34 includes a comparator 35. The inverting input terminal of the comparator 35 is connected to the CA terminal and to the non-inverting input terminal, reference voltages Vref1$h$ and Vref1$l$ that are threshold values for determining a light load are supplied. Since the reference voltages Vref1$h$ and Vref1$l$ have two values, the comparator 35 forms a hysteresis comparator.

The load detection circuit 26 receives the signal sw_ctrl from the control circuit 23. As illustrated in FIG. 12, this signal sw_ctrl corresponds to the high-side reference voltage VS at the VS terminal. That is, the voltage HO at the HO terminal and the voltage LO at the LO terminal alternately turn to the H (high) level and when the high-side reference voltage VS is at the H level, the signal sw_ctrl turns to the H level and when the high-side reference voltage VS is at the L (low) level, the signal sw_ctrl turns to the L level.

Consequently, the switch sw1 remains on from the rise until the fall of the high-side reference voltage VS and applies a high-side current I_Qa, i.e., a voltage proportional to the input current to the switching power supply apparatus to the point A. The switch sw2 remains on from the fall until the rise of the high-side reference voltage VS and applies a voltage (=zero. This is because during this period of time, the high-side switching element Qa is off, and therefore, the input current is zero.) proportional to the high-side current I_Qa during this period of time with the point A grounded to the point A. Due to this, to the point A, a voltage exactly proportional to the high-side current I_Qa (input current) is applied and the voltage is averaged by the averaging circuit 31 and the averaged voltage CA becomes a signal indicating a load state. That is, the load state, i.e., the output power is equal to the input power except for the conversion loss and the input power is the product of the input current and the input voltage Vi, and therefore, when the input voltage Vi is constant, (the average value of) the input current becomes a signal indicating a load state.

The voltage CA indicating a load state is supplied to the automatic burst control signal generation circuit 34 and whether the load is heavy or light is determined. That is, when the load is heavy, a large resonant current flows and the voltage CA is higher than the reference voltage Vref1h, and therefore, the comparator 35 supplies the burst enable signal bur_en at the L level to the burst control circuit 27. On the other hand, when the load becomes light and the voltage VCA becomes lower than the reference voltage Vref1l, the comparator 35 supplies the burst enable signal bur_en at the H level to the burst control circuit 27.

Upon receipt of the burst enable signal bur_en at the H level from the load detection circuit 26, the burst control circuit 27 starts burst control and generates a switching control signal sw_stop that causes the control circuit 23 to periodically perform switching and switching stop. That is, as illustrated in FIG. 13, during the burst control, the control circuit 23 repeats the switching operation and the switching stop with a period Tpb made up of a period of time Tpb1 during which switching is performed and a period of time Tpb2 during which switching is stopped as one period.

In the example illustrated in FIG. 13, the burst control circuit 27 counts the on-trigger signal on_trg output by the oscillation circuit 22 with a built-in counter and when the count number reaches "5", the burst control circuit 27 turns the switching control signal sw_stop to the H level. Due to this, the next on-trigger signal on_trg becomes invalid and the voltage HO at the high-side HO terminal remains the L level, and thus, the switching operation is stopped. Next, when the count number of the invalid on-trigger signals on_trg reaches "3", the switching control signal sw_stop turns to the L level. Due to this, the next on-trigger signal on_trg becomes valid and the voltage LO at the H level is output from the low-side LO terminal in synchronization with the rise of the on-trigger signal on_trg, and thus, switching is returned.

Here, during the period of time Tpb2 during which the switching operation is stopped, i.e., in the state where the switching elements Qa and Qb are off, a resonant phenomenon occurs due to an LC circuit including the capacitors Ca and Cb. At this time, the voltage (the high-side reference voltage VS at the VS terminal) that appears at one end of the primary winding P1 of the transformer T1 and a current ILr that flows through the primary winding P1 oscillate with a period Tp1 as illustrated in FIG. 13. This period Tp1 is represented as period $Tp1 = 2*\pi\sqrt{(L*C)}$.

Here, L is a combined inductance of the resonant inductance and the excitation inductance of the transformer T1. Further, C is a combined capacitance of the capacitors Ca and Cb connected in equivalently parallel and the resonant capacitor C5 connected in series with the capacitors Ca and Cb. That is, if the capacitances of the capacitors Ca and Cb are taken to be Ca and Cb and the capacitance of the resonant capacitor C5 is taken to be Cr, C is represented as $C = (Ca+Cb)*Cr/(Ca+Cb+Cr)$.

That is, during the period of time of the burst control, switching is returned in the state where the LC circuit is resonating.

The timing of return of switching in the burst control is the timing of rise of the on-trigger signal on_trg that is output from the oscillation circuit 22. At this time, the high-side reference voltage VS at the VS terminal fluctuates at all times, and therefore, there is a case where the low-side switching element Qb turns on at the timing when the high-side reference voltage VS is high. At this time, an energy loss Ploss of the capacitors Ca and Cb is represented as $Ploss = 0.5*(Ca+Cb)*VS\_ON^2$ where the high-side reference voltage VS at the time of return of switching is VS_ON. That is, the energy loss Ploss of the capacitors Ca and Cb is proportional to the square of the voltage VS_ON at the time of return of switching, and therefore, the higher the voltage VS_ON at the time of return of switching, the greater the energy loss Ploss of the capacitors Ca and Cb is. Further, at the time of return of switching, the charges stored in the capacitors Ca and Cb are discharged instantaneously by the switching element Qb, and therefore, there has been such a problem that noise occurs because a large current flows.

SUMMARY OF THE INVENTION

According to an aspect of the present disclosure, there is provided a switching power supply apparatus of a current-resonant type including: a first switching element and a second switching element connected in series; a series circuit of a resonant inductance and a resonant capacitor connected in parallel to the first switching element or the second switching element; a first capacitor and a second capacitor connected in parallel to the first switching element and the second switching element, respectively, and forming a resonant circuit together with the series circuit when switching of the first switching element and the second switching element is stopped; and a switching control circuit that alternately turns on the first switching element and the second switching element, wherein the switching control circuit includes: a load detection circuit that detects a load state upon receipt of a signal indicating a load state; a burst control circuit that switches switching control of the first switching element and the second switching element from normal control to burst control to repeat a switching operation and a switching stop when the load detection circuit detects that the load state indicates a light load; and a high-side reference voltage bottom detection circuit that detects timing when a high-side reference voltage at a connection point between the first switching element and the second switching element becomes the lowest, and the burst control circuit returns the switching control from the switching stop to the switching operation at the timing when the high-side reference voltage bottom detection circuit detects the timing when the high-side reference voltage becomes the lowest.

The object and advantageous of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
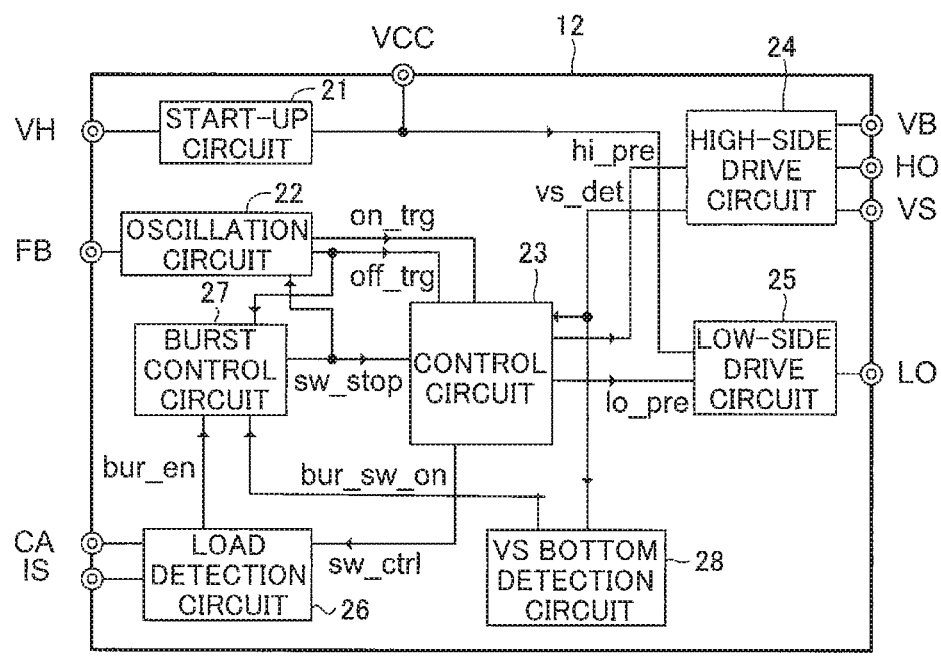
FIG. 1 illustrates a configuration example of a control IC of a switching power supply apparatus according to a first embodiment.

Several embodiments will be described below with reference to the accompanying drawings, wherein like reference numerals refer to like elements throughout. Note that it is possible to perform each embodiment in combination with a plurality of embodiments within a range where there is no inconsistency. Furthermore, in the following explanation also, there is a case where the terminal name, and the voltage, the signal, etc., at the terminal are explained by using the same symbol.

First Embodiment

Figure 9:
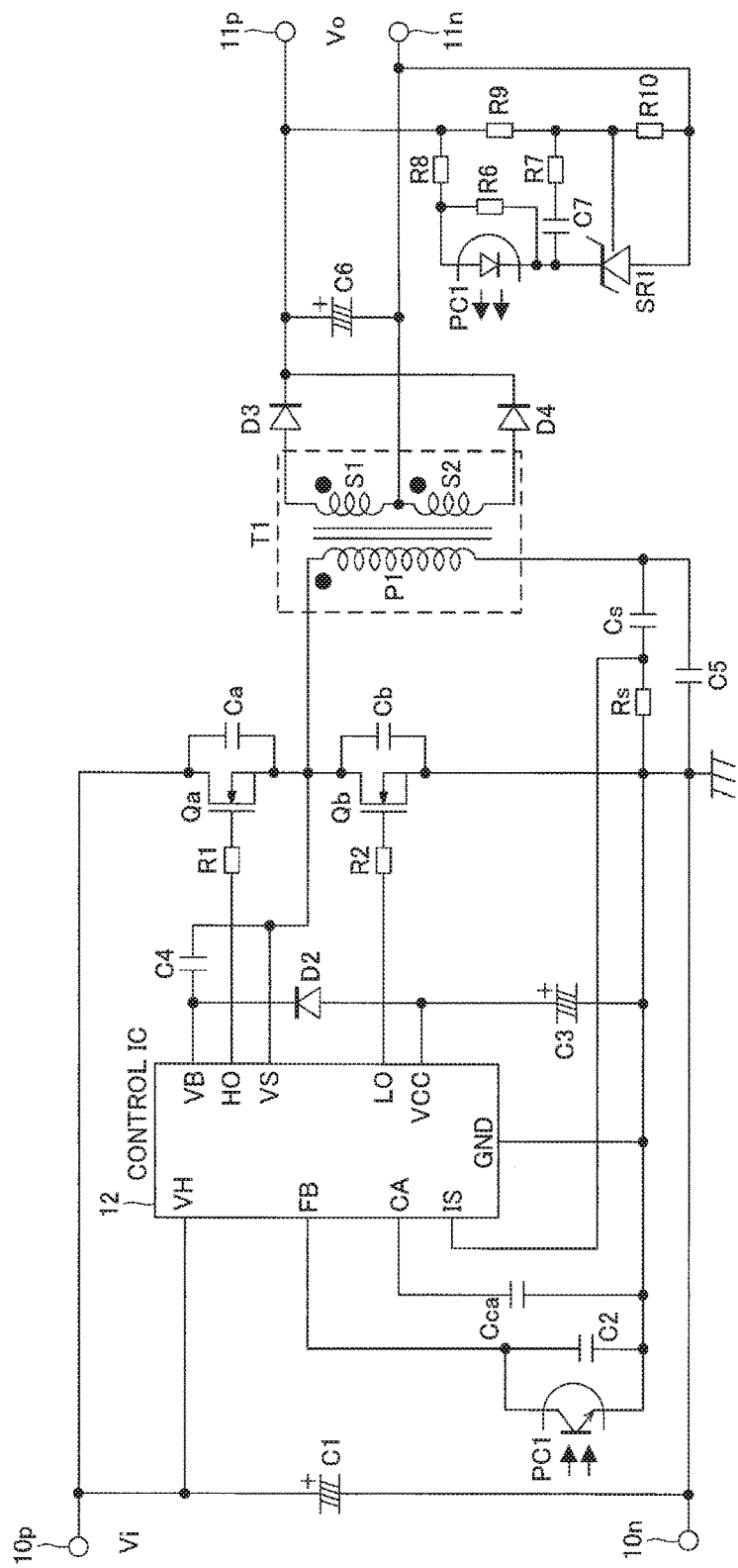
FIG. 9 is a circuit diagram that illustrates a configuration example of a conventional switching power supply apparatus.

FIG. 1 illustrates a configuration example of a control IC of a switching power supply apparatus according to a first embodiment. Note that the configuration of the switching power supply apparatus according to the first embodiment is the same as the configuration illustrated in FIG. 9, and therefore, explanation of components other than the control IC is given with reference to FIG. 9. Here, it may also be possible to add an inductor made up of an individual part to a resonant capacitor in series in addition to a leakage inductance as a resonant inductance.

Figure 10:
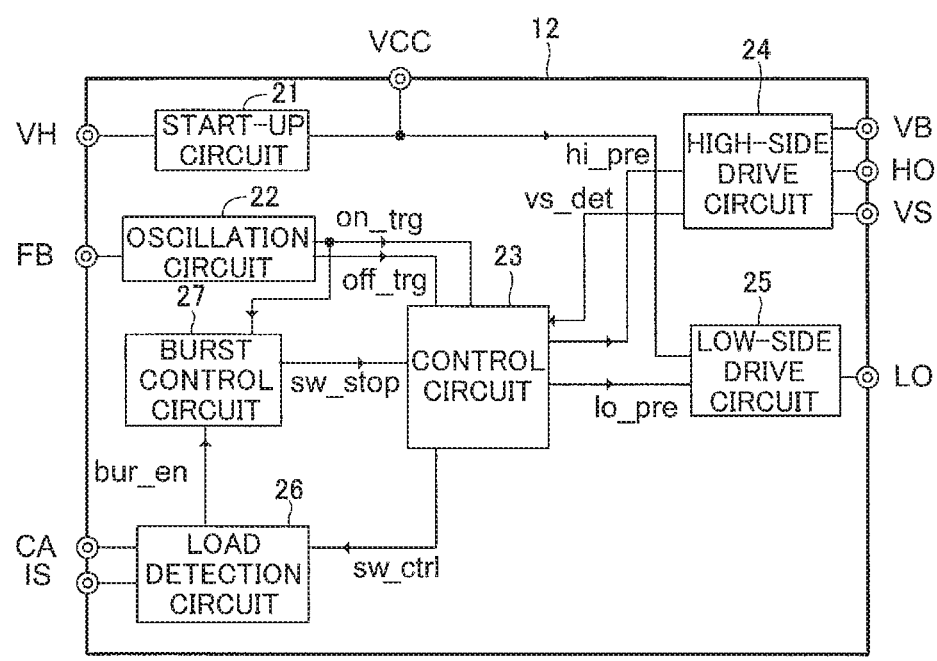
FIG. 10 illustrates a configuration example of a conventional control IC.
Figure 11:
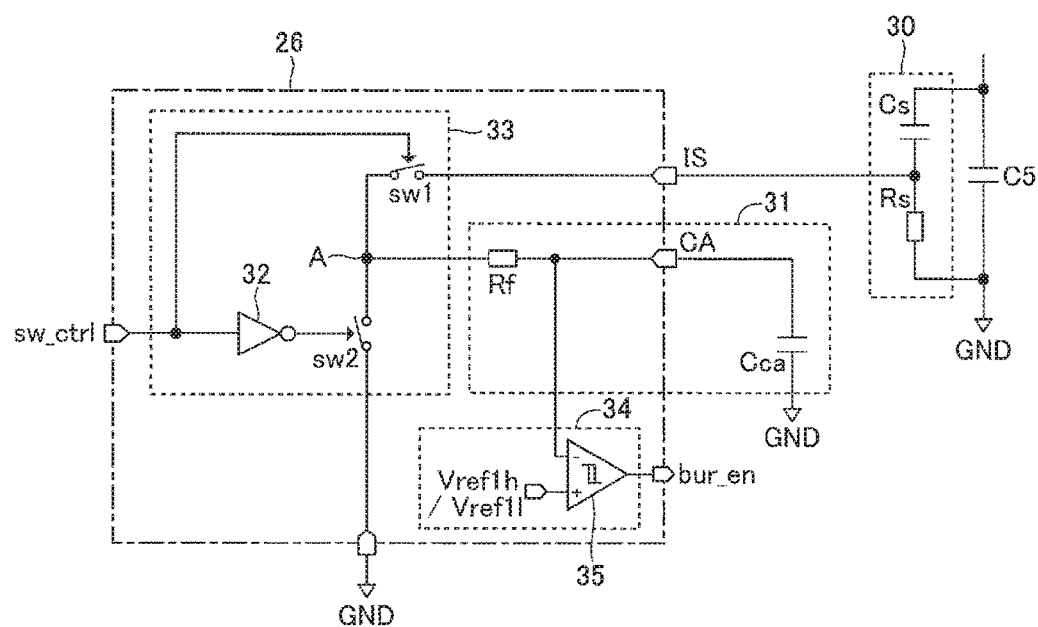
FIG. 11 is a circuit diagram that illustrates a configuration example of a conventional load detection circuit.
Figure 12:
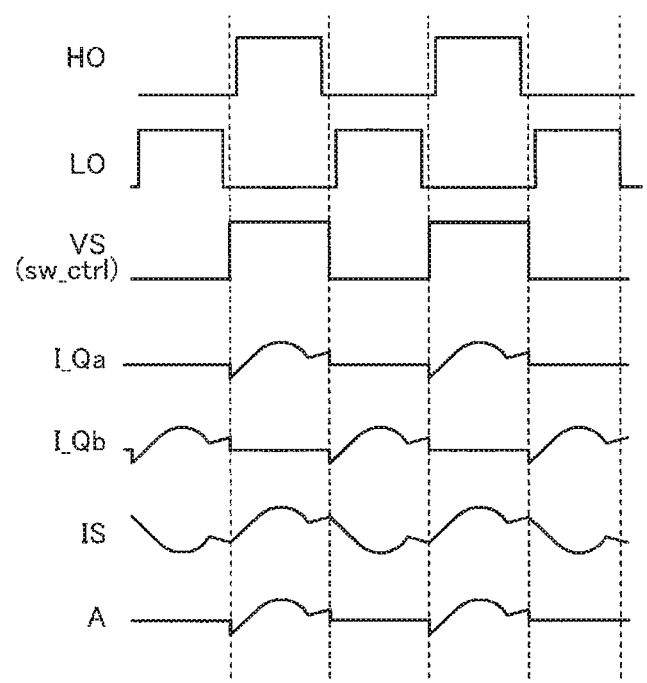
FIG. 12 is a voltage generation timing chart at a point A of the conventional load detection circuit.
Figure 13:
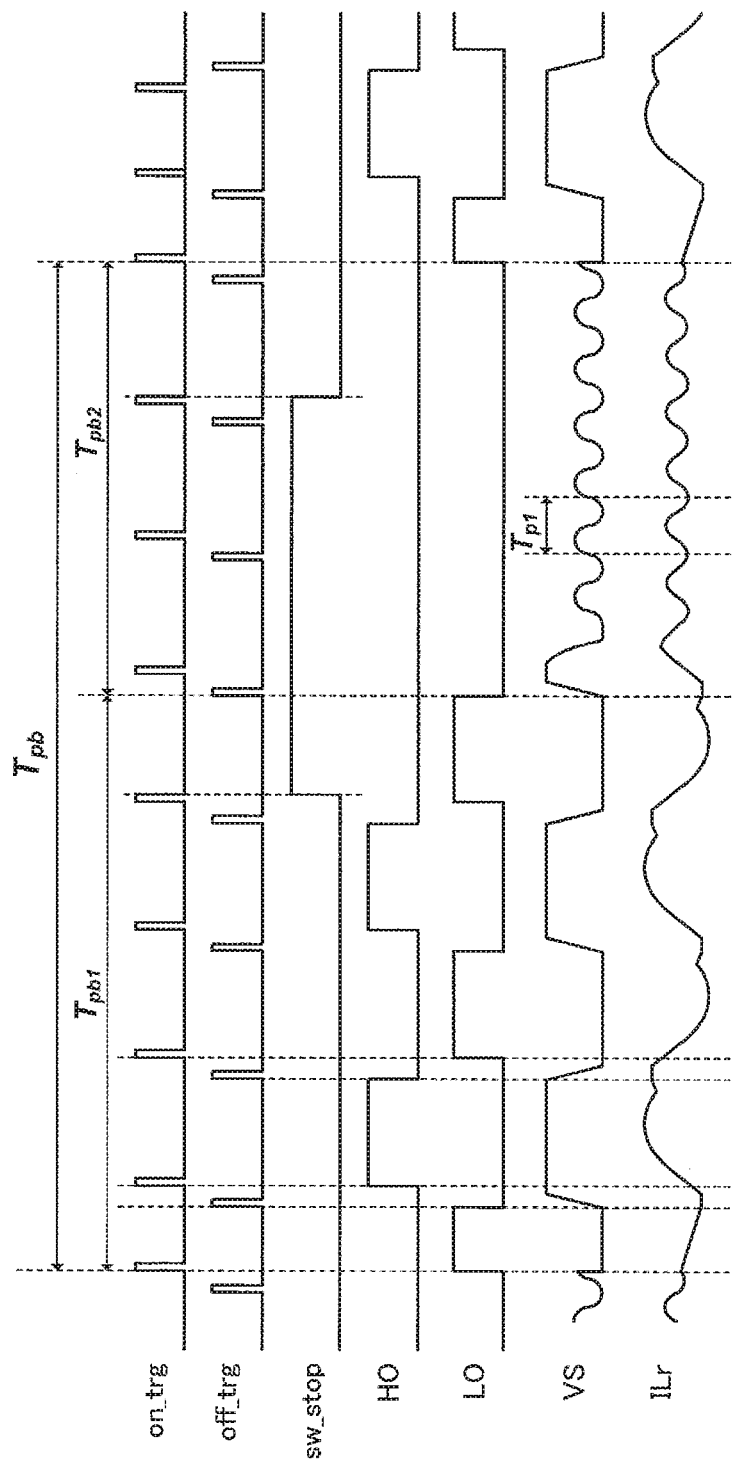
FIG. 13 is a timing chart of conventional burst control.

To the control IC 12 of the switching power supply apparatus according to the first embodiment, a VS bottom detection circuit 28 is added compared to the control IC 12 illustrated in FIG. 10. The VS bottom detection circuit 28 receives the high-side reference voltage detection signal vs_det, which is the detection voltage at the VS terminal output by the high-side drive circuit 24, and generates and supplies a switching return signal bur_sw_on to the burst control circuit 27. The burst control circuit 27 receives the burst enable signal bur_en from the load detection circuit 26, the switching return signal bur_sw_on from the VS bottom detection circuit 28, and the off-trigger signal off_trg from the oscillation circuit 22 and outputs the switching control signal sw_stop.

In accordance with the control IC 12, when the load detection circuit 26 outputs the burst enable signal bur_en, the burst control is started. Due to this, the control circuit 23 controls switching of the switching elements Qa and Qb so as to perform the switching operation and switching stop with the period of the switching control signal sw_stop received from the burst control circuit 27. Here, while the switching control signal sw_stop is instructing to perform switching stop, the VS bottom detection circuit 28 first counts the number of times the high-side reference voltage VS at the VS terminal becomes lower than a predetermined threshold value. Next, when the count value reaches a predetermined number, the VS bottom detection circuit 28 outputs the switching return signal bur_sw_on after timing the elapse of the time until the high-side reference voltage VS reaches the lowest value (bottom) from the predetermined threshold value. That is, the VS bottom detection circuit 28 outputs the switching return signal bur_sw_on to return the switching operation at the timing when the high-side reference voltage VS reaches the bottom or the vicinity of the bottom. Upon receipt of the switching return signal bur_sw_on, the burst control circuit 27 switches the switching control signal sw_stop from the instruction of switching stop to the instruction of switching operation. Upon receipt of the switching control signal sw_stop, the oscillation circuit 22 immediately generates one on-trigger signal on_trg and the control circuit 23 turns on the low-side switching element Qb to return the switching operation. The control circuit 23 thereafter controls the switching operation of the switching elements Qa and Qb in accordance with the off-trigger signal off_trg and the on-trigger signal on_trg that are output by the oscillation circuit 22.

As described above, the timing of return of the switching operation in the burst control is set to the timing when the high-side reference voltage VS reaches the bottom or the vicinity of the bottom. The switching element Qb is turned on at the timing when the high-side reference voltage VS is sufficiently low, and therefore, the energy loss Ploss of the capacitors Ca and Cb is reduced and the occurrence of noise is accordingly suppressed.

Next, the configuration example of the specific circuit within the control IC 12 for returning the switching operation in the burst control at the timing when the high-side reference voltage VS reaches the bottom is explained.

Figure 2:
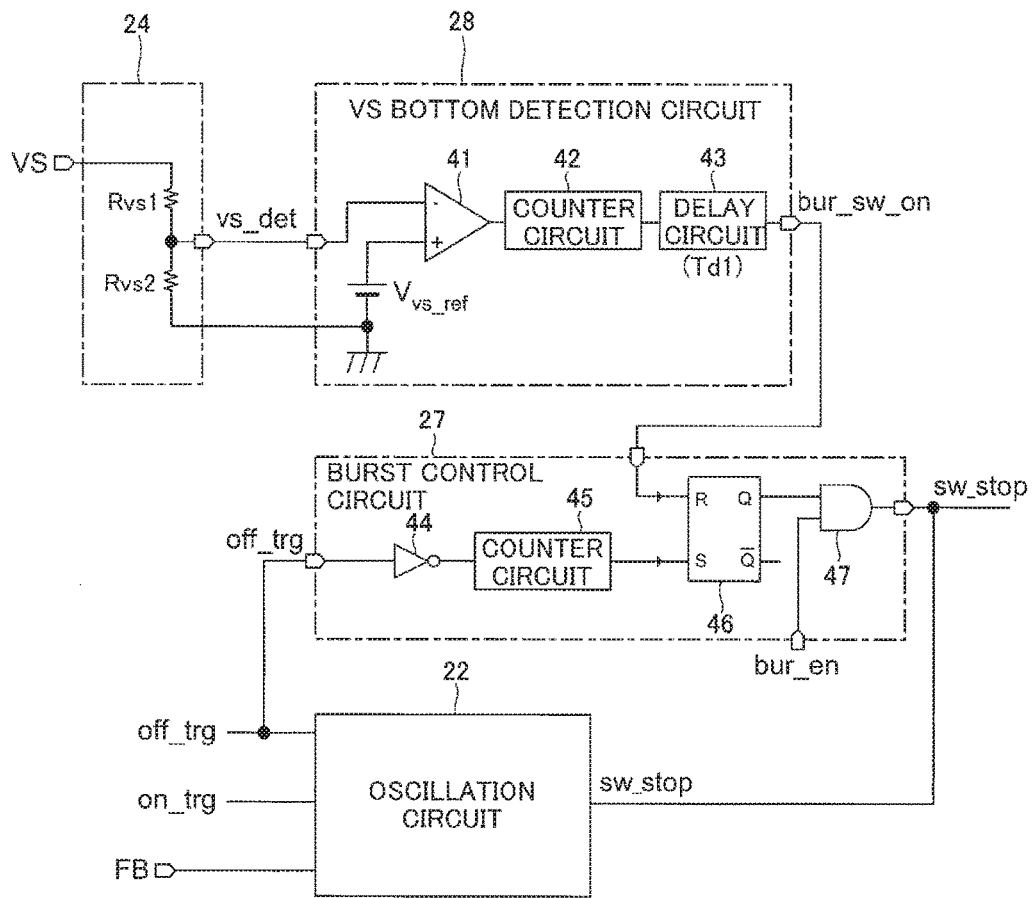
FIG. 2 illustrates a related circuit that generates a switching control signal of the first embodiment.
Figure 3:
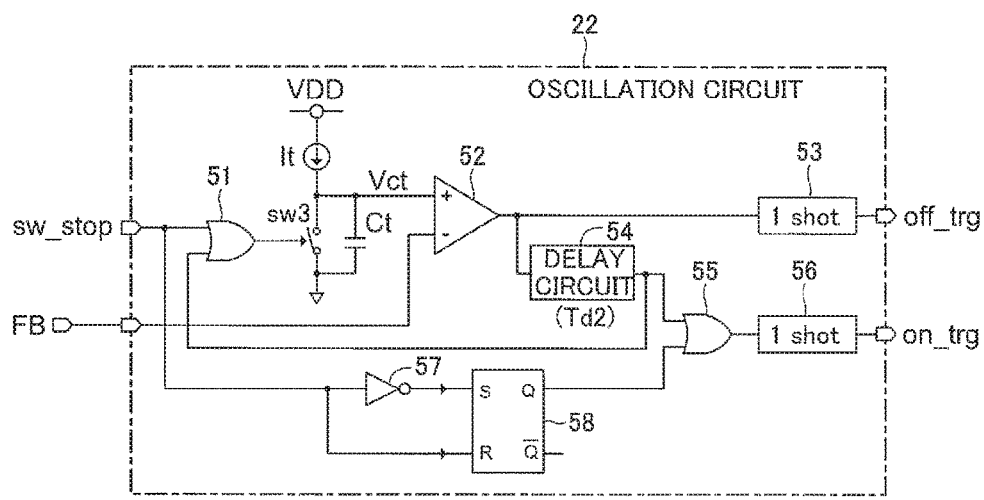
FIG. 3 is a circuit diagram that illustrates an example of an oscillator of the first embodiment.
Figure 4:
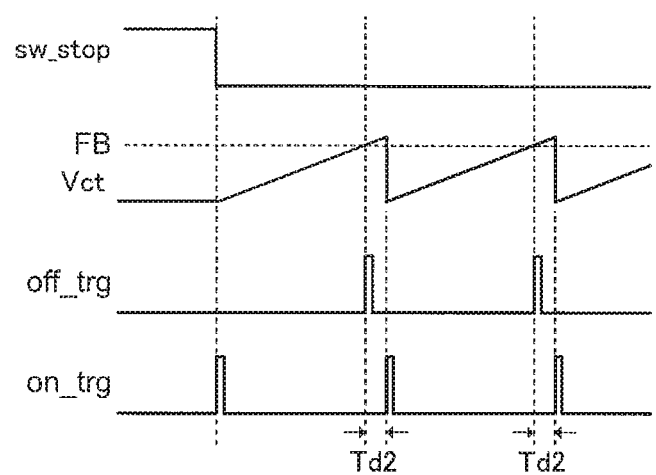
FIG. 4 is a timing chart of switching control signals of the first embodiment.
Figure 5:
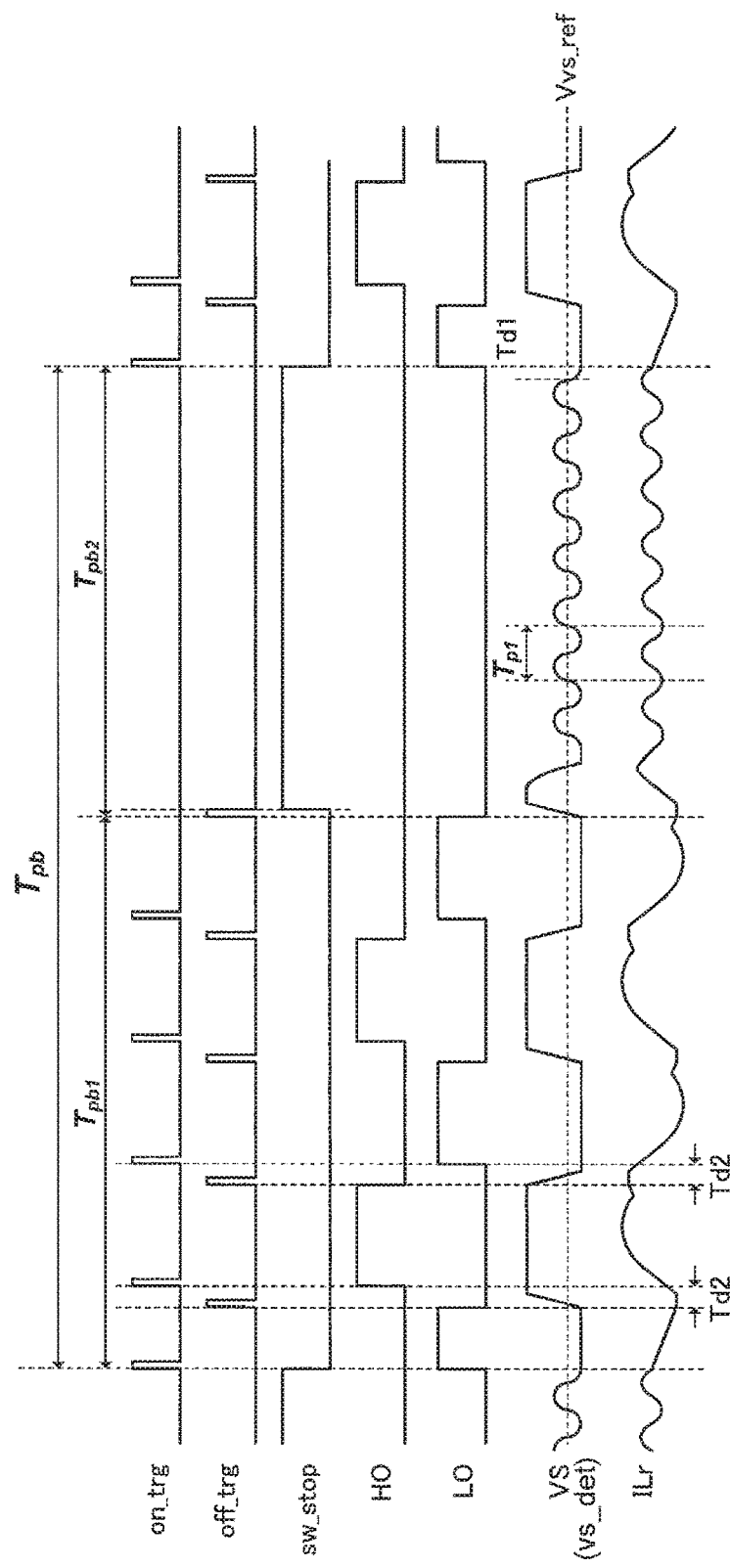
FIG. 5 is a timing chart of burst control of the first embodiment.

FIG. 2 illustrates a related circuit that generates a switching control signal of the first embodiment, FIG. 3 is a circuit diagram that illustrates an example of an oscillator of the first embodiment, FIG. 4 is a timing chart of switching control signals of the first embodiment, and FIG. 5 is a timing chart of burst control of the first embodiment.

First, FIG. 2 illustrates the configuration for monitoring the high-side reference voltage VS at the VS terminal of the high-side drive circuit 24 and generating the switching control signal sw_stop that sets timing to return the switching control from the switching stop to the switching operation to the timing when the high-side reference voltage VS reaches the bottom or the vicinity of the bottom.

In the high-side drive circuit 24, to the VS terminal, one end of a resistor Rvs1 is connected, the other end of the resistor Rvs1 is connected to one end of a resistor Rvs2, and the other end of the resistor Rvs2 is connected to the ground. Due to this, the high-side reference voltage VS that appears at the VS terminal is divided by the resistors Rvs1 and Rvs2 and to a common connection point between the resistors Rvs1 and Rvs2, the high-side reference voltage detection signal vs_det proportional to the high-side reference voltage VS is output.

The VS bottom detection circuit 28 has a comparator 41, a counter circuit 42, and a delay circuit 43. To the inverting input terminal of the comparator 41, the common connection point between the resistors Rvs1 and Rvs2 is connected and to the non-inverting input terminal, a reference voltage Vvs_ref is supplied. As illustrated in FIG. 5, the reference voltage Vvs_ref has the center voltage value of the wave height value of the high-side reference voltage VS (high-side reference voltage detection signal vs_det) that appears when the above-described LC circuit resonates during switching stop. Consequently, the comparator 41 outputs a signal at the H level each time the high-side reference voltage detection signal vs_det becomes lower than the reference voltage Vvs_ref.

The output terminal of the comparator 41 is connected to the input terminal of the counter circuit 42 and the output terminal of the counter circuit 42 is connected to the input terminal of the delay circuit 43. The output terminal of the delay circuit 43 forms the output terminal of the VS bottom detection circuit 28 and outputs the switching return signal bur_sw_on.

The counter circuit 42 counts the signal at the H level which is output by the comparator 41 and when the count number reaches a predetermined value, a count-up signal is sent to the delay circuit 43. The delay circuit 43 delays the count-up signal by a predetermined time (delay time Td1) and generates the switching return signal bur_sw_on.

In the example illustrated in FIG. 5, during the period of time Tpb2 during which the switching operation is stopped, the number of times the high-side reference voltage detection signal vs_det obtained by dividing the high-side reference voltage VS becomes lower than the reference voltage Vvs_ref is counted. When the counter circuit 42 counts a predetermined value "8", the delay circuit 43 operates and the timing is delayed by the predetermined delay time Td1. The delay time Td1 is ¼ of the period Tp1 of the oscillation that occurs when the switching operation is stopped and the timing after the delay time Td1 elapses is the timing when the oscillation waveform reaches the bottom. Due to this, the VS bottom detection circuit 28 detects the bottom of the high-side reference voltage VS as a result, and thus, outputs the switching return signal bur_sw_on in the form of a pulse and the period of time Tpb2 during which the switching operation is stopped terminates.

The burst control circuit 27 has an inverter circuit 44, a counter circuit 45, an RS flip-flop 46, and an AND circuit 47. The input terminal of the inverter circuit 44 is connected to the terminal to receive the off-trigger signal off_trg from the oscillation circuit 22 and the output terminal is connected to the input terminal of the counter circuit 45. The output terminal of the counter circuit 45 is connected to the set terminal of the RS flip-flop 46. The reset terminal of the RS flip-flop 46 is connected to the terminal to receive the switching return signal bur_sw_on from the VS bottom detection circuit 28 and the output terminal is connected to one input terminal of the AND circuit 47. The other input terminal of the AND circuit 47 is connected to the terminal to receive the burst enable signal bur_en from the load detection circuit 26 and the output terminal forms the output terminal of the burst control circuit 27 and outputs the switching control signal sw_stop.

The burst control circuit 27 starts the switching operation by receiving the switching return signal bur_sw_on at the H level from the VS bottom detection circuit 28 during the burst control during which the burst enable signal bur_en at the H level is being received. That is, when the RS flip-flop 46 is reset upon receipt of the switching return signal bur_sw_on, the burst control circuit 27 outputs the switching control signal sw_stop at the L level. Due to this, the burst control makes a transition from the period of time Tpb2 of the switching stop to the period of time Tpb1 of the switching operation. During the period of time Tpb1, the number of times of the fall of the off-trigger signal off_trg is counted by the counter circuit 45 and when the count number of times reaches a predetermined number ("5" in the example in FIG. 5), the RS flip-flop 46 is set. Due to this, the burst control circuit 27 outputs the switching control signal sw_stop at the H level and the burst control makes a transition from the period of time Tpb1 of the switching operation to the period of time Tpb2 of the switching stop.

Note that the burst control circuit 27 is receiving the burst enable signal bur_en at the L level during the normal control, not the burst control, and therefore, the switching control signal sw_stop is fixed to the L level.

As illustrated in FIG. 3, the oscillation circuit 22 has a terminal to receive the switching control signal sw_stop from the burst control circuit 27 and the voltage FB from the FB terminal of the control IC 12, and a terminal to output the off-trigger signal off_trg and the on-trigger signal on_trg.

The terminal of the switching control signal sw_stop is connected to one input terminal of an OR circuit 51 and the output terminal of the OR circuit 51 is connected to the control terminal of a switch sw3. One terminal of the switch sw3 is connected to one terminal of a constant current source It and the other terminal of the constant current source It is connected to the line of the power source voltage VDD of the internal power source. The other terminal of the switch sw3 is connected to the ground. A connection point between the switch sw3 and the constant current source It is connected to one terminal of a capacitor Ct and to the non-inverting input terminal of a comparator 52. The other terminal of the capacitor Ct is connected to the ground. The inverting input terminal of the comparator 52 is connected to the terminal to receive the voltage FB and the output terminal of the comparator is connected to the input terminals of a one-shot circuit 53 and a delay circuit 54, respectively. The output terminal of the one-shot circuit 53 is connected to the terminal to output the off-trigger signal off_trg. The output terminal of the delay circuit 54 is connected to one input terminal of an OR circuit 55 and the output terminal of the OR circuit 55 is connected to the input terminal of a one-shot circuit 56. The output terminal of the one-shot circuit 56 is connected to the terminal to output the on-trigger signal on_trg. The output terminal of the delay circuit 54 is further connected to the other input terminal of the OR circuit 51.

Furthermore, the terminal of the switching control signal sw_stop is connected to the input terminal of an inverter circuit 57 and the output terminal of the inverter circuit 57 is connected to the set terminal of an RS flip-flop 58. The reset terminal of the RS flip-flop 58 is connected to the terminal of the switching control signal sw_stop and the output terminal of the RS flip-flop is connected to the other input terminal of the OR circuit 55.

In the oscillation circuit 22, the OR circuit 51, the switch sw3, the constant current source It, the capacitor Ct, the comparator 52, and the delay circuit 54 form a sawtooth wave oscillation circuit. That is, as illustrated in FIG. 4, when the switching control signal sw_stop is at the L level, the switch sw3 turns off (cutoff state), and therefore, the capacitor Ct is charged by the current of the constant current source It and a terminal voltage Vct of the capacitor Ct increases. When the terminal voltage Vct of the capacitor Ct exceeds the voltage FB, the output signal of the comparator 52 switches from the signal at the L level to the signal at the H level. The one-shot circuit 53 outputs the off-trigger signal off_trg with a fixed time width which rises in synchronization with the rising edge of the signal at the H level.

The output signal at the H level of the comparator 52 is input to the delay circuit 54 and delayed by a predetermined delay time Td2. The delayed signal is input to the one-shot circuit 56 via the OR circuit 55 and the one-shot circuit 56 outputs the on-trigger signal on_trg with a fixed time width which rises in synchronization with the rising edge of the delayed signal. That is, the on-trigger signal on_trg is output after being delayed from the off-trigger signal off_trg by the delay time Td2.

The signal delayed in the delay circuit 54 is also input to the other input terminal of the OR circuit 51. Due to this, the switch sw3 turns on (connected state) and the charges charged in the capacitor Ct are discharged rapidly. Due to the discharge of the capacitor Ct, the terminal voltage Vct lowers to the ground level and the output signal of the comparator 52 turns to the L level. The delay circuit 54 is an on-delay circuit (time limit operation instantaneous return circuit) that delays the input signal by the rising edge of the input signal, and therefore, when the input signal turns to the L level, the delay circuit 54 immediately outputs the signal at the L level. Due to this, the switch sw3 turns off and the capacitor Ct resumes constant current charging.

On the other hand, the oscillation circuit 22 outputs only one on-trigger signal on_trg in synchronization with the falling edge when the switching control signal sw_stop turns to the L level.

That is, during the switching stop of the burst control, the switching control signal sw_stop is at the H level and at this time, the RS flip-flop 58 is reset and the output terminal of the RS flip-flop 58 remains at the L level. Here, when the switching stop returns to the switching operation, the switching control signal sw_stop turns to the L level. Due to this, to the set terminal of the RS flip-flop 58, the signal at the H level is input, which is inverted logically by the inverter circuit 57, and therefore, the RS flip-flop 58 enters the set state and outputs the signal at the H level. The signal at the H level is input to the one-shot circuit 56 via the OR circuit 55 and the on-trigger signal on_trg is output from the one-shot circuit 56. The on-trigger signal on_trg corresponds to the pulse that rises in synchronization with the falling edge of the switching control signal sw_stop in FIG. 4 and corresponds to the pulse that appears immediately after the termination of the period of time Tpb2 in FIG. 5.

As above, in the switching power supply apparatus according to the first embodiment, the timing when the burst control returns from the switching stop to the switching operation is set to the timing when the high-side reference voltage VS becomes low. When the high-side reference voltage VS becomes low, the low-side switching element Qb is turned on, and therefore, it is possible to reduce loss and noise that occur at the time of return of switching in the burst control.

Second Embodiment

Figure 6:
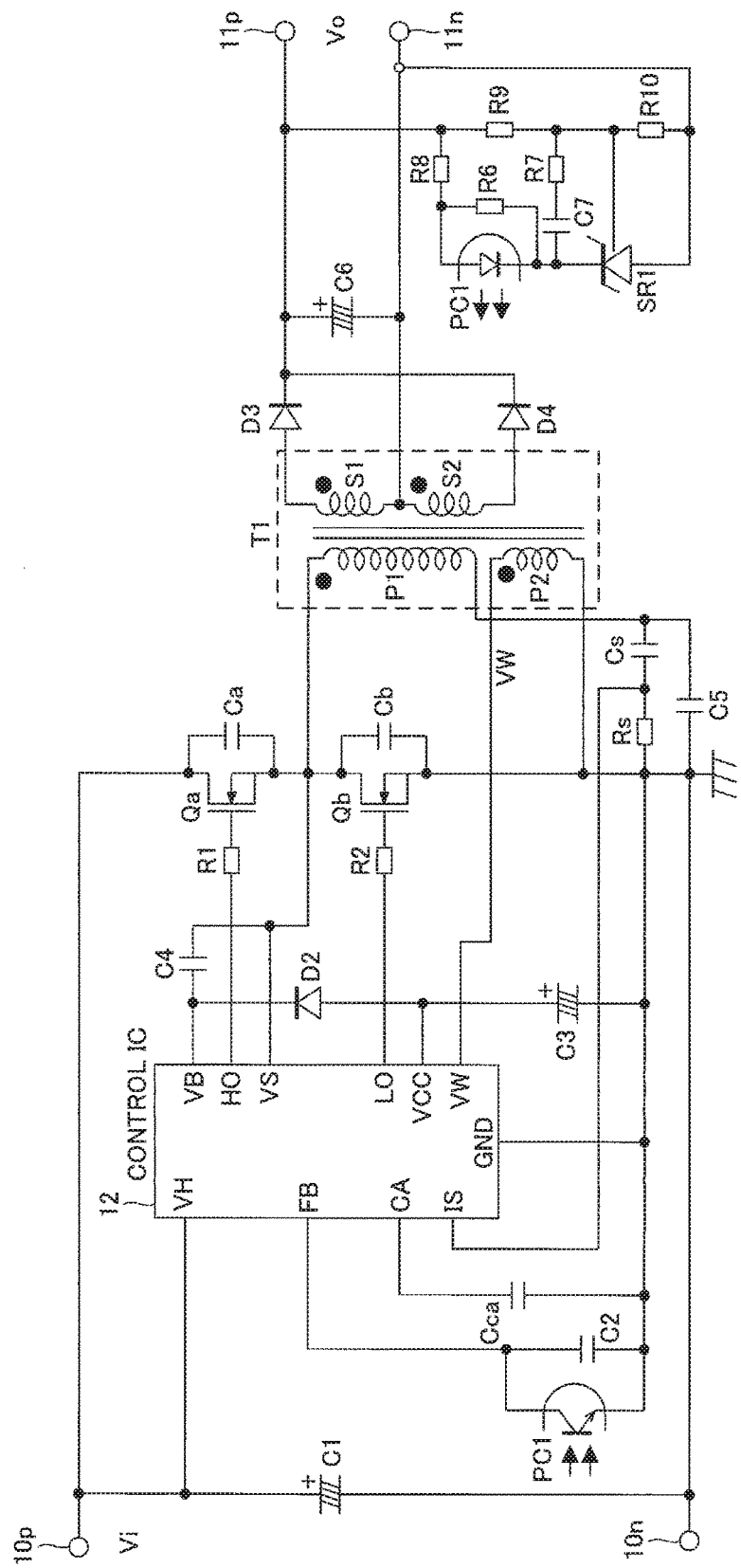
FIG. 6 is a circuit diagram that illustrates a configuration example of a switching power supply apparatus according to a second embodiment.
Figure 7:
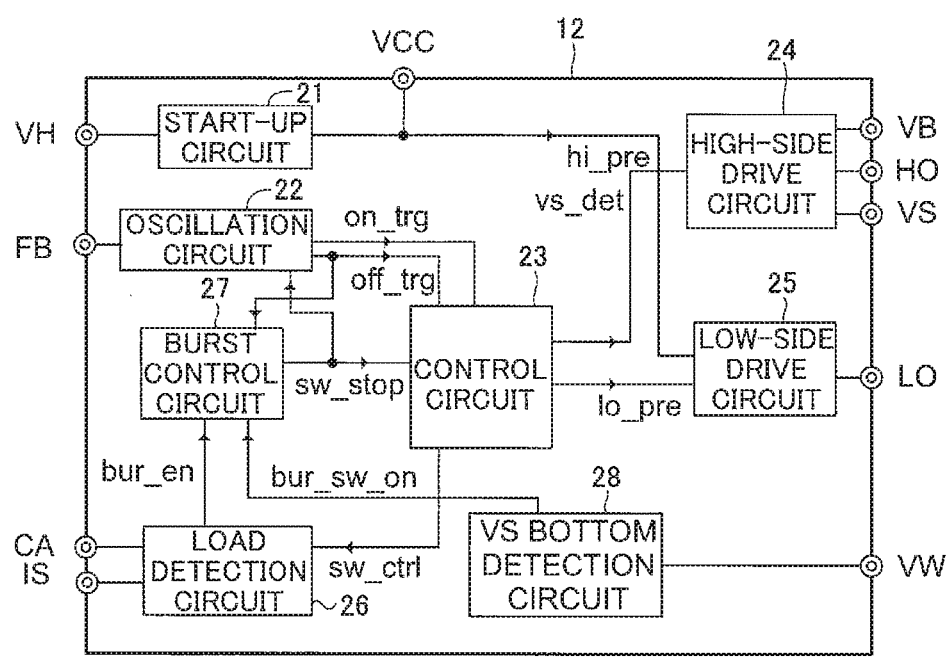
FIG. 7 illustrates a configuration example of a control IC of the switching power supply apparatus according to the second embodiment.
Figure 8:
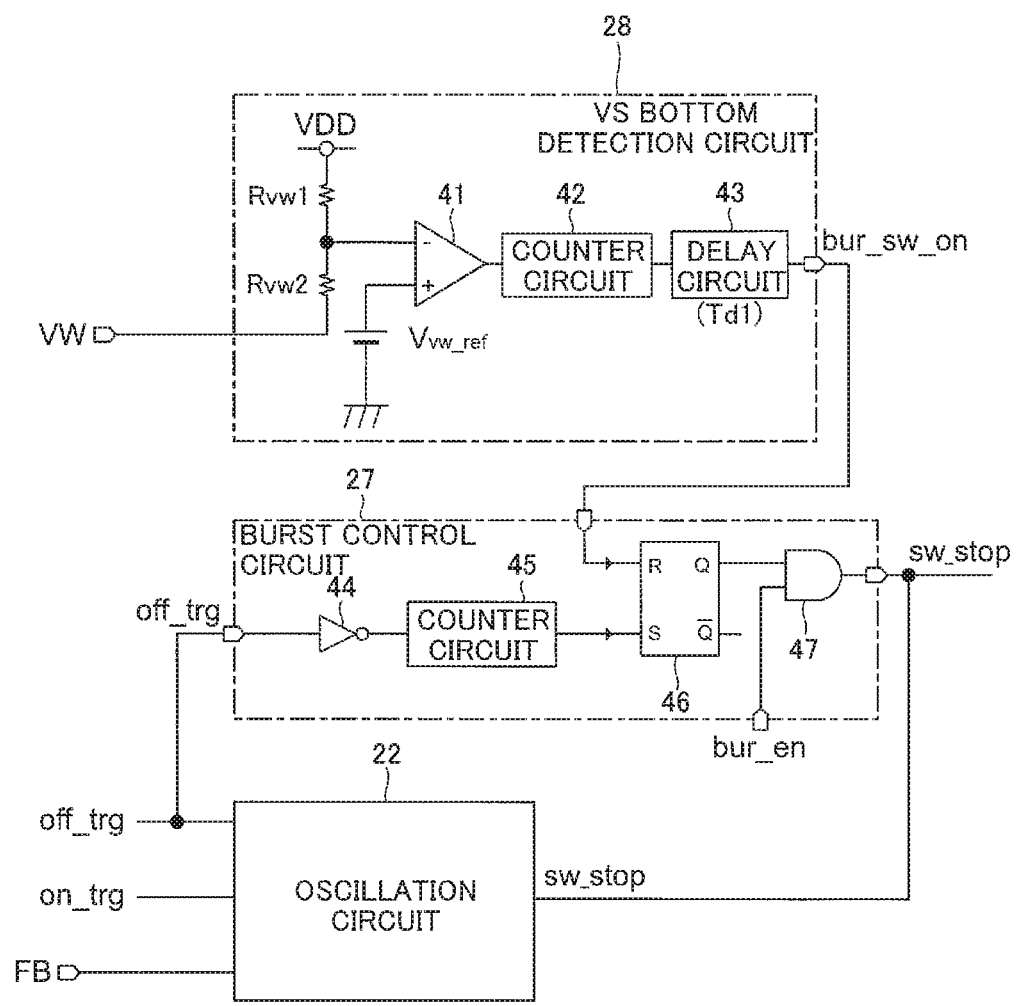
FIG. 8 illustrates a related circuit that generates a switching control signal of the second embodiment.

FIG. 6 is a circuit diagram that illustrates a configuration example of a switching power supply apparatus according to a second embodiment, FIG. 7 illustrates a configuration example of a control IC of the switching power supply apparatus according to the second embodiment, and FIG. 8 illustrates a related circuit that generates a switching control signal of the second embodiment. In FIG. 6, the same symbols are attached to the same components as the components illustrated in FIG. 9 or equivalent components, in FIG. 7, the same symbols are attached to the same components as the components illustrated in FIG. 1 or equivalent components, and in FIG. 8, the same symbols are attached to the same components as the components illustrated in FIG. 2 or equivalent components, and detailed explanation thereof is omitted.

In the switching power supply apparatus according to the second embodiment, as illustrated in FIG. 6, the transformer T1 has an auxiliary winding P2. The waveform of an auxiliary winding voltage VW generated by the auxiliary winding P2 is similar to the waveform of the high-side reference voltage VS that is applied to the primary winding P1. Consequently, in the second embodiment, the bottom detection of the high-side reference voltage VS is performed indirectly by using the auxiliary winding voltage VW generated in the auxiliary winding P2 of the transformer T1.

As illustrated in FIG. 7, the control IC 12 of the second embodiment has the VW terminal and the auxiliary winding voltage VW that is input to the VW terminal is supplied to the VS bottom detection circuit 28. The VS bottom detection circuit 28 generates the switching return signal bur_sw_on from the auxiliary winding voltage VW and supplies the switching return signal bur_sw_on to the burst control circuit 27.

As illustrated in FIG. 8, in the VS bottom detection circuit 28, one end of a resistor Rvw1 is connected to the line of the power source voltage VDD, the other end of the resistor Rvw1 is connected to one end of a resistor Rvw2 and the other end of the resistor Rvw2 is connected to the VW terminal. A common connection point between the resistors Rvw1 and Rvw2 is connected to the inverting input terminal of the comparator 41. A reference voltage Vvw_ref is supplied to the non-inverting input terminal of the comparator 41. Here, the resistors Rvw1 and Rvw2 are resistors for level-shifting (shifting up) the center voltage of the wave height value of the oscillation waveform of the auxiliary winding voltage VW because the center voltage is grounded when the switching elements Qa and Qb are off. The resistors Rvw1 and Rvw2 have the same resistance value and the reference voltage Vvw_ref has a voltage value ½ of the power source voltage VDD. Due to this, the comparator 41 compares the VW detection voltage obtained by level-shifting the center voltage of the wave height value of the auxiliary winding voltage VW to ½ of the power source voltage VDD with the reference voltage Vvw_ref, and detects the timing when the VW detection voltage becomes lower than the reference voltage Vvw_ref.

The counter circuit 42 counts the number of times of the timing when the VW detection voltage becomes lower than the reference voltage Vvw_ref and when the count number reaches a predetermined value, a signal at the H level is sent to the delay circuit 43. The delay circuit 43 delays the signal at the H level by a predetermined time (delay time Td1), and generates and outputs the switching return signal bur_sw_on in the form of a pulse which rises at the timing when the auxiliary winding voltage VW is the lowest.

In the burst control circuit 27, upon receipt of the switching return signal bur_sw_on, the RS flip-flop 46 is reset and outputs a signal at the L level to the output terminal, and therefore, the AND circuit 47 outputs the switching control signal sw_stop at the L level.

In the oscillation circuit 22, upon receipt of the switching control signal sw_stop at the L level, the RS flip-flop 58 is set and outputs a signal at the H level to the output terminal, and the one-shot circuit 56 outputs the on-trigger signal on_trg. Due to this, the switching power supply apparatus returns to the switching operation of the burst control from the switching stop of the burst control. In the switching operation of the burst control, the oscillation circuit 22 periodically generates the off-trigger signal off_trg and the on-trigger signal on_trg is generated a predetermined time late after the generation of the off-trigger signal off_trg.

The switching power supply apparatus with the above-described configuration has an advantage that the occurrence of loss and noise is reduced considerably because the timing of return of switching in the burst control is set to the point of time when the high-side reference voltage is the lowest.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply apparatus of a current-resonant type, comprising:
    a first switching element and a second switching element connected in series;
    a series circuit of a resonant inductance and a resonant capacitor, connected in parallel to the first switching element or the second switching element;
    a first capacitor and a second capacitor connected in parallel to the first switching element and the second switching element, respectively, and forming a resonant circuit together with the series circuit at a switching stop of the first switching element and the second switching element; and
    a switching control circuit that alternately turns on the first switching element and the second switching element, the switching control circuit including
        a load detection circuit that detects a load state,
        a burst control circuit that switches to a burst control mode, in which switching operation and the switching stop of the first and second switching elements are repeated, when the load state detected by the load detection circuit indicates a light load, and
        a high-side reference voltage bottom detection circuit that detects a timing at which a high-side reference voltage at a connection point between the first switching element and the second switching element has a lowest value, wherein
            the burst control circuit switches from the switching stop to the switching operation of the first and second switching elements at the detected timing.

2. The switching power supply apparatus according to claim 1, wherein the high-side reference voltage bottom detection circuit includes:
    a comparator that detects a plurality of times, at each of which the high-side reference voltage becomes lower than a predetermined reference voltage during the switching stop in the burst control mode;
    a counter circuit that counts a number of the detected times to generate an output signal; and
    a delay circuit that delays the output signal of the counter circuit by a predetermined time.

3. The switching power supply apparatus according to claim 2, wherein
    the predetermined reference voltage is a voltage corresponding to a center of a wave height value of the high-side reference voltage that is oscillating by the resonant circuit during the switching stop in the burst control mode.

4. The switching power supply apparatus according claim 3, wherein
    the comparator uses, as the high-side reference voltage, a voltage obtained by dividing a voltage at the connection point between the first switching element and the second switching element.

5. The switching power supply apparatus according to claim 3, wherein
    the resonant inductance includes a transformer; and
    the comparator uses, as the high-side reference voltage, a voltage generated by an auxiliary winding of the transformer.

6. The switching power supply apparatus according to claim 1, wherein
    the switching control circuit further includes an oscillation circuit configured to generate a signal for the switching operation of the first and second switching elements,
    the burst control circuit outputs a first signal to stop an oscillation operation to the oscillation circuit during the switching stop in the burst control mode, and outputs a second signal to resume the oscillation operation to the oscillation circuit upon receipt of the detected timing from the high-side reference voltage bottom detection circuit.

7. The switching power supply apparatus according to claim 6, wherein
    the oscillation circuit outputs an on-trigger signal to turn on the first switching element or the second switching element on a low side when the burst control circuit switches to the switching operation, and thereafter repeatedly generates an off-trigger signal and the on-trigger signal.

* * * * *